(12) United States Patent
Otto et al.

(10) Patent No.: US 8,628,734 B2
(45) Date of Patent: *Jan. 14, 2014

(54) METHOD FOR RECOVERY OF RARE EARTHS FROM FLUORESCENT LAMPS

(75) Inventors: Robert Otto, Stadtbergen (DE); Agnieszka Wojtalewicz-Kasprzak, Emlichheim (DE)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/179,667

(22) Filed: Jul. 11, 2011

(65) Prior Publication Data

US 2012/0027651 A1 Feb. 2, 2012

Related U.S. Application Data

(63) Continuation of application No. 12/227,032, filed as application No. PCT/EP2007/055295 on May 31, 2007, now Pat. No. 7,976,798.

(30) Foreign Application Priority Data

Jun. 2, 2006 (DE) .................. 10 2006 025 945

(51) Int. Cl.
*C01F 17/00* (2006.01)
(52) U.S. Cl.
USPC ........................................ 423/21.5; 423/21.1
(58) Field of Classification Search
USPC ............................................... 423/21.1, 21.5
See application file for complete search history.

(56) References Cited

U.S. PATENT DOCUMENTS 5,567,403 A 10/1996 Kimura et al.

FOREIGN PATENT DOCUMENTS

| DE | 3410989 A1 | 9/1985 |
|---|---|---|
| DE | 246551 A1 | 3/1986 |
| DE | 19617942 C1 | 6/1997 |
| DE | 19918793 A1 | 11/2000 |
| EP | 0157249 B1 | 6/1989 |
| EP | 1138741 A1 | 10/2001 |
| JP | 7315816 A | 12/1995 |
| JP | 11029312 | 2/1999 |
| JP | 11071111 | 3/1999 |
| JP | 2000192167 A | 7/2000 |
| JP | 2004352900 A | 12/2004 |
| TW | 494438 B | 7/2002 |

OTHER PUBLICATIONS

English language abstract for JP 11071111, Mar. 1999.
English language abstract for EP 0 157 249 B1, Mar. 1985.
English language abstract for DE 196 17 942 C1, Jun. 1997.
English language abstract for DE 199 18 793 A1, Nov. 2000.
English language abstract for JP 11029312, Feb. 1999.
English language machine translation for DD246551, Jun. 1986.
English abstract for JP 2004-352900, Dec. 2004.
English abstract for JP 2000-192167, Jul. 2000.

*Primary Examiner* — Melissa Stalder

(57) ABSTRACT

Method of recovery of rare earths from fluorescent lamps. The method comprises six steps. The individual process steps are: Mechanical separation of coarse components. Separation of the halophosphate. Extraction in acids of easily soluble rare-earth fluorescent substances (mainly Y, Eu-oxide) Extraction in acids of rare earth fluorescent substances which dissolve with difficulty (for example rare-earth phosphates) Breakdown of the remaining components which contain rare earths (for example rare-earth-aluminates) Final treatment.

3 Claims, 5 Drawing Sheets

METHOD FOR RECOVERY OF RARE EARTHS FROM FLUORESCENT LAMPS

RELATED APPLICATIONS

This application is a continuation under 35 USC 120 of application Ser. No. 12/227,032 filed on Nov. 25, 2008 which is a U.S. National Phase Application under 35 USC 371 of International Application PCT/EP2007/055295, filed May 31, 2008, both of which are incorporated herein in their entirety by reference.

TECHNICAL FIELD

The invention is based on a method for recovering rare earths from fluorescent lamps according to the preamble of claim 1. Such methods are suitable in particular for linear fluorescent lamps, but also compact fluorescent lamps.

BACKGROUND

In the past, fluorescent lamps waste has often been disposed of as special waste. The method approaches currently known for reprocessing fluorescent materials principally describe methods which are aimed at recovering the individual components, in particular the rare earth fluorescent materials.

The methods developed are intended to employ economically acceptable means in order to achieve the required quality, which allows unrestricted reuse of the reprocessed products as fluorescent material.

DE-A 34 10 989 describes a method based on two-stage acidic leaching with subsequent precipitation of rare earths by oxalic acid. In the first stage, the halophosphate is separated from the three-band fluorescent material mixture by leaching with nitric acid. The remaining rare earth fluorescent material mixture is re-treated with a nitric acid at least at 90° C. The rare oxides enter into solution. After the solid-liquid separation, the solid material consisting of the insoluble aluminate fluorescent materials is washed, dried and heat treated. Yttrium and europium are precipitated as a mixed oxalate form the filtrate by adding 10% strength oxalic acid. DD-A 246 551 describes complete dissolving of the fluorescent material component containing rare earths in hydrochloric or nitric acid at 90° C. In order to separate the divalent metals, the rare earths are subsequently precipitated as hydroxides from the solution with ammonia. The hydroxides are redissolved in hydrochloric or nitric acid and then precipitated as oxalates. In its present form, however, this rare earth oxide mixture is not suitable for direct use in fluorescent material production, rather only as an intermediate product for an additional elaborate process of separating rare earth elements.

DE-A 196 17 942 bases the reprocessing on treatment of the fluorescent material waste with dilute hydrochloric acid. The halophosphate fluorescent materials are brought into solution as much as possible with dilute hydrochloric acid with the addition of oxidizing agents. After the solid/liquid separation, the rare earth fluorescent materials remaining in the residue are washed thoroughly with deionized water, separated from the aqueous phase and heat treated at T>1200° C.

DE-A 199 18 793 describes a method for three-band fluorescent materials, in which yttrium-europium oxide is recovered as a single component. Its quality allows unrestricted reuse in fluorescent material production. In the first stage, mercury and halophosphate fluorescent materials are dissolved form the fluorescent material waste by means of nitric acid. In the second stage, the rare earth fluorescent material mixture is treated with carbonate alkali. The yttrium-europium oxide selectively enters into solution, and is precipitated as yttrium-europium carbonate and subsequently heat treated to form the oxide.

JP-A 11071111 discloses a method for the extraction of rare earth compounds. A substance, which contains rare earth metals, is treated mechanochemically for a predetermined time in order to modify the crystal structure. The resulting substance is then leached with an acid, specifically at a low concentration, in order to extract the compound containing rare earths. Here, the rare earths are in particular Y and Sc or an element from the lanthanoid group. The mechanochemical treatment is preferably carried out with a highly energetic tool. The acid at a low concentration is preferably hydrochloric acid and sulfuric acid with a concentration of N≤1. Since the rare earth compound can be extracted from the fluorescent lamp waste under comparatively mild conditions, the working environment can be made relatively safe here. In particular, the fluorescent lamp waste may be classed as a promising future municipal source of rare earths. This provides a possibility for recycling rare raw materials.

These publications usually adopt the approach of recovering fluorescent materials "directly" by selective dissolving. The fluorescent materials are either isolated as solid residues after dissolving or, in the case of yttrium-europium oxide "YOE" i.e. $Y_2O_3$:Eu, they are precipitated again after dissolving. In the first method, the very fine glass slivers remaining in the residue and the fact that the residue contains all the insoluble components prevent use as a fluorescent material with sufficient quality. In the case of $Y_2O_3$:Eu, the luminous efficiency is likewise reduced by co-precipitation of killer elements (for example calcium, terbium) to such an extent that use in fluorescent lamp manufacture is not possible.

The other publications do in fact aim to recover the rare earths in the form of various compounds. In the second method, however, it is extremely unlikely that terbium will be recovered quantitatively. Although the grinding method employed in the fifth method increases the yield of terbium, the data for dissolved aluminum and magnesium show however that this effect is only to a small extent attributable to the digestion of insoluble aluminates.

Since terbium in particular is nowadays one of the economically most important and most expensive rare earth elements, particular value must be placed specifically on complete extraction of this element.

Although the majority of the europium component is obtained as the readily soluble compound $Y_2O_3$:Eu (three-band red fluorescent material), from an economical viewpoint the extraction of europium from insoluble compounds in particular is not to be neglected since europium compounds are currently the second most expensive component for the production of three-band fluorescent materials.

BRIEF DESCRIPTION

It is an object of the represent invention to provide a method which makes it possible to recover elements such as terbium, europium and yttrium for use in fluorescent material production.

This object is achieved by the characterizing features of claim 1.

Particularly advantageous configurations may be found in the dependent claims.

A fraction containing fluorescent materials, which are separated from the lamp bulb, is obtained when recycling fluorescent lamps. This fluorescent material powder is obtained as a mixture of halophosphate, three-band and other fluorescent materials, which inter alia is contaminated by glass slivers and metals and—to a varying degree—with mercury. Direct recycling into the production process is therefore not possible. Fluorescent material waste, about 250 to 300 tonnes per year in Germany, has previously been put into underground storage owing to its toxicity and the insufficient reprocessing possibilities.

It represents a not inconsiderable raw material potential owing to the rare earth content of about 10% by weight, calculated as oxide, especially because it contains more of the scarce and therefore expensive rare earth elements terbium and europium than the best-known natural sources.

The novel method adopts the approach of sending the fluorescent material waste to controlled recycling. The rare earths (RE) are recovered as individual components, preferably as RE oxides, with a quality which corresponds to the products produced from natural ores and which therefore allows unrestricted use in the production of new fluorescent materials. Previous recycling methods have ended either with poor-quality fluorescent material which is unusable for lamp manufacture, or with a method which is not very effective, so that only a fraction of the rare earth fluorescent materials contained in the waste is utilized. The essential advantage of the new method is that the recycling loop includes a rare earth separation process and therefore leads to unrestrictedly useable highly pure rare earth oxides, which cannot in principle be obtained by other methods.

For this purpose, the following problems needed to be resolved:
  quantitative and qualitative determination of the material composition of the waste containing fluorescent materials, in particular its RE content and the contaminants which are present;
  development of mechanical methods for the enrichment of fluorescent materials containing RE by separating the contaminants (for example glass slivers);
  development of an extraction method for maximally quantitative recovery of the rare earths;
  reprocessing of the RE extract to form compounds whose quality corresponds to commercially available raw materials, in particular for fluorescent material production;
  all the method steps are optimized while taking into account the residual waste generated.

The aim of the newly developed method described below to obtain a synthetic rare earth compound by various separation, dissolving and digestion processes by precipitation, in which the proportion of economically important rare earths is at least as high as in naturally occurring ores. Above all, owing to the fact that a fluorescent material mixture is used as the starting material, the proportion of terbium and europium is much higher than in natural occurrence.

The spent fluorescent material is a mixture of various fluorescent materials, the primary constituents of which are halophosphate and three-band fluorescent materials. This fluorescent material mixture is contaminated above all by lamp components such as bulb glass, metal (filaments, supply electrodes, cap), plastic (cap, insulators) and cement. Depending on the origin and pretreatment (mercury removal) of the spent fluorescent material, mercury contamination may also occur. In what follows, mercury-free material will be assumed.

Typical proportions by weight in the spent fluorescent material are presented in Tab.1.

TABLE 1

| Constituent | Proportion in % by weight |
|---|---|
| Coarse fraction | 65-70% |
| Fine fraction | 25-30% |
| Rare earths (as oxide in the fine fraction | About 10% (depending on the starting material) |

The process steps may be combined in any desired way depending on the fluorescent material types present in the spent fluorescent material and their quantitative proportions.

By fully dissolving fluorescent material components containing rare earths, the insoluble lamp residues (for example glass) are also separated.

The process may be constructed from the following modules. They may be combined in any desired way. Schematics 1 to 4 represent possible examples of process sequences. These process steps have not previously been employed for fluorescent material recycling. For the first time, it has been possible to extract the rare earths as much as possible and convert them back into raw materials, particularly in the form of oxides. This process sequence is optimized so that, for a given process outlay, the yield of expensive rare earths specifically required for fluorescent material production is maximal. The great advantage of this recovery is that the precursor material contains only these raw materials which are needed for lamp fluorescent materials, while virgin ores contain all possible other rare earths which can be separated only with difficulty.

The individual process steps are:
1. mechanical separation of coarse parts.
2. separation of the halophosphate.
3. extraction of RE fluorescent materials readily soluble in acids (mainly Y, Eu oxide).
4. extraction of RE fluorescent materials insoluble in acids (for example RE phosphates).
5. digestion of the remaining components containing RE (for example RE aluminates).
6. final treatment.

The first step is the mechanical separation of coarse parts.

Coarse residual constituents of the fluorescent lamps are removed, such as glass slivers, metal, plastic or cement residues.

Since the three-band fluorescent materials containing rare earths typically have average particle sizes $d_{50} < 10$ μm, and scarcely ever have particle sizes larger than 20 μm, screening is carried out with the smallest possible mesh width for the best possible enrichment.

Depending on the method, the screening may be carried out in one or more stages.

The mesh width of the finest screening likewise depends on the method being used, and it is typically a mesh width of 25 μm for a dry screening process or 20 μm for a wet screening process.

The fine material is reprocessed further by chemical methods.

The second step is separation of the halophosphate. Here, there are several possibilities.

The first is cold leaching. In the temperature range below 30° C., acids (for example hydrochloric acid) do not attack or only slightly attack yttrium-europium oxide, which is the most acid-soluble of the three-band fluorescent materials. The other components, particularly the aluminates, are resistant under these conditions and remain in the insoluble residue.

After the sold-liquid separation, the residue containing the rare earths is sent to the next processing step and the filtrate is fed to the waste reprocessing system.

A second possibility is hot leaching. In contrast to halophosphates, rare earth oxides dissolve in acids (for example HCL) only in the range between 60° C. and 90° C. Under the prevailing conditions (pH=0, T=90° C.), not only are halophosphate and yttrium-europium oxide digested rapidly, but also other fluorescent materials are attacked so that further rare earths partly enter into solution.

When the solution contains the calcium ions in very high concentration, they co-precepitate owing to their solubility product during the rare earth oxalate precipitation, and need to be separated.

The separation of calcium and rare earths is carried out by precipitation from sulfate. After the solid-liquid separation, calcium sulfate (gypsum) remains in the residue and the filtrate contains the rare earths.

Simplified separation of calcium ions from halophosphate is obtained by the described method of halophosphate separation with sulfuric acid. In the strong sulfuric acid solution corresponding to pH=0 to 1, the halophosphate dissolves rapidly at ambient temperature. The $Ca^{2+}$ ions which interfere with the further method sequence are fully precipitated as insoluble calcium sulfate. The other fluorescent material powder components, such as RE oxides readily soluble in acids and insoluble RE phosphates, are also attacked by the strong sulfuric acid solution at room temperature. Double sulfates insoluble in acid may thereby be formed, which enter into solution when the residue is washed out with cold water.

If the fine material contains high proportions of halophosphate, this proportion may preferably be reduced by gravity separation before the wet chemical treatment. Together with the halophosphate, this step advantageously also separates other contaminants whose density is less than the density value selected for the halophosphate separation.

A further, third step is extraction of the RE compounds readily soluble in acids.

Among the readily soluble RE compounds, the spent fluorescent material primarily contains rare earth oxide ($Y_2O_3$: Eu) which is soluble at elevated temperature, preferably between 60° and 90° C.

It is possible to dissolve the RE oxides in hydrochloric acid or in sulfuric acid.

In this temperature range or a higher temperature range, the rare earth oxides enter fully into solution and the insoluble aluminates remain in the residue.

A further, fourth method step is extraction of the RE compounds insoluble in acids.

In order to obtain the rare earths from the insoluble cerium- and terbium-doped lanthanum phosphate, this fluorescent material is dissolved either in acids or in alkalis, this method being referred to as acidic or alkaline (or basic) digestion. In the case of acidic digestion, the phosphate is dissolved in 120-230° hot concentrated sulfuric acid, while the very stable aluminates such as CAT and BAM remain undissolved. After the solid-liquid separation, the rare earths are obtained either in ionic form in the filtrate or as insoluble double sulfates.

The double sulfates are brought into solution by washing out the residue with cold water.

A further, fifth step is digestion of the remaining components containing RE.

A large part of the aluminate fluorescent materials used in fluorescent lamps remains in the insoluble residue from the preceding process steps, in particular barium-magnesium aluminate doped with europium (BAM) and cerium-magnesium aluminate doped with terbium (CAT).

A first option for this is alkaline digestion.

In alkaline digestion, these fluorescent materials are digested either by potassium or sodium hydroxide or by soda/potash melt.

In the first case, the aluminate mixture is converted by treatment with 150° C. hot 35% strength sodium or potassium hydroxide under pressure into the mixture of insoluble hydroxides. Here, insoluble phosphates such as lanthanum phosphate are also digested.

In the case of alkaline digestion, the aluminates are melted by a mixture of soda/potash. The melt cakes are extracted with hot water or with acid.

The undissolved residues are centrifuged off and disposed of as waste in both cases.

A second option for the fifth step, which may be carried out in addition or as an alternative to the first option, in acidic digestion.

Here the aluminates are digested in acid, for example phosphoric or sulfuric acid, at elevated temperature and if necessary also at an elevated pressure. The solutions contain the rare earths. If need be, the double sulfates obtained when using sulfuric acid are extracted from the residues with cold water.

The sixth step is lastly the final treatment and precipitation.

The rare earths are precipitated from the solutions obtained in the various process steps.

The precipitation of the rare earths is carried out either with oxalic acid solution as oxalates or with ammonia in order to precipitate the rare earths in the form of basic salts.

The oxalates are subsequently heat treated to form oxides.

The rare earth compounds obtained in this way are used as "synthetic ore" in the standard separation process for rare earths and reprocessed after the separation to form any desired RE compounds.

Particular advantages of the novel method in at most six steps are: The fluorescent material powder is obtained as a separate fraction in the fluorescent lamp recycling. The fluorescent material waste containing mercury is arranged as "waste requiring special monitoring" and should be stored as special waste. The tailor-made recycling process reduces the mass and volume of the special waste intended for disposal, which contributes to reducing the transport and disposal costs as well as reducing the burden on the storage site and benefiting the human environment.

Owing to their constituents, in particular rare earth element content, fluorescent waste represents a raw material potential. Recovery of the expensive RE elements, in a form which allows reuse in fluorescent material production, reduces the burden on natural resources. The relevant materials are processed not for waste storage but, purely sorted, into directly usable RE compounds. For the production of a product containing RE, preferably lamp fluorescent materials, these compounds, preferably oxides, can be incorporated without restriction into established processes. Both the manufacturing sequence itself and the quality of the final product correspond to the standard method.

Fluorescent material recycling is expedient not only for ecological reasons, but also for economic reasons. Besides important raw materials, the energy required for obtaining raw material is also saved.

The residual materials incurred during the process of recycling the fluorescent material waste are less environmentally harmful than the fluorescent material powder initially incurred during lamp recovery. This reduction of pollution facilitates disposal of these byproducts.

The new recycling technology corresponds to the requirements of contemporary waste disposal. The fluorescent material recycling helps in the construction of modern recycling systems, the material circuits actually being closed in an economical and environmentally friendly way.

BRIEF DESCRIPTION OF THE DRAWINGS

The invention will be explained in more detail below with the aid of several exemplary embodiments. In the figures.

PREFERRED EMBODIMENT OF THE INVENTION

Figure 1:
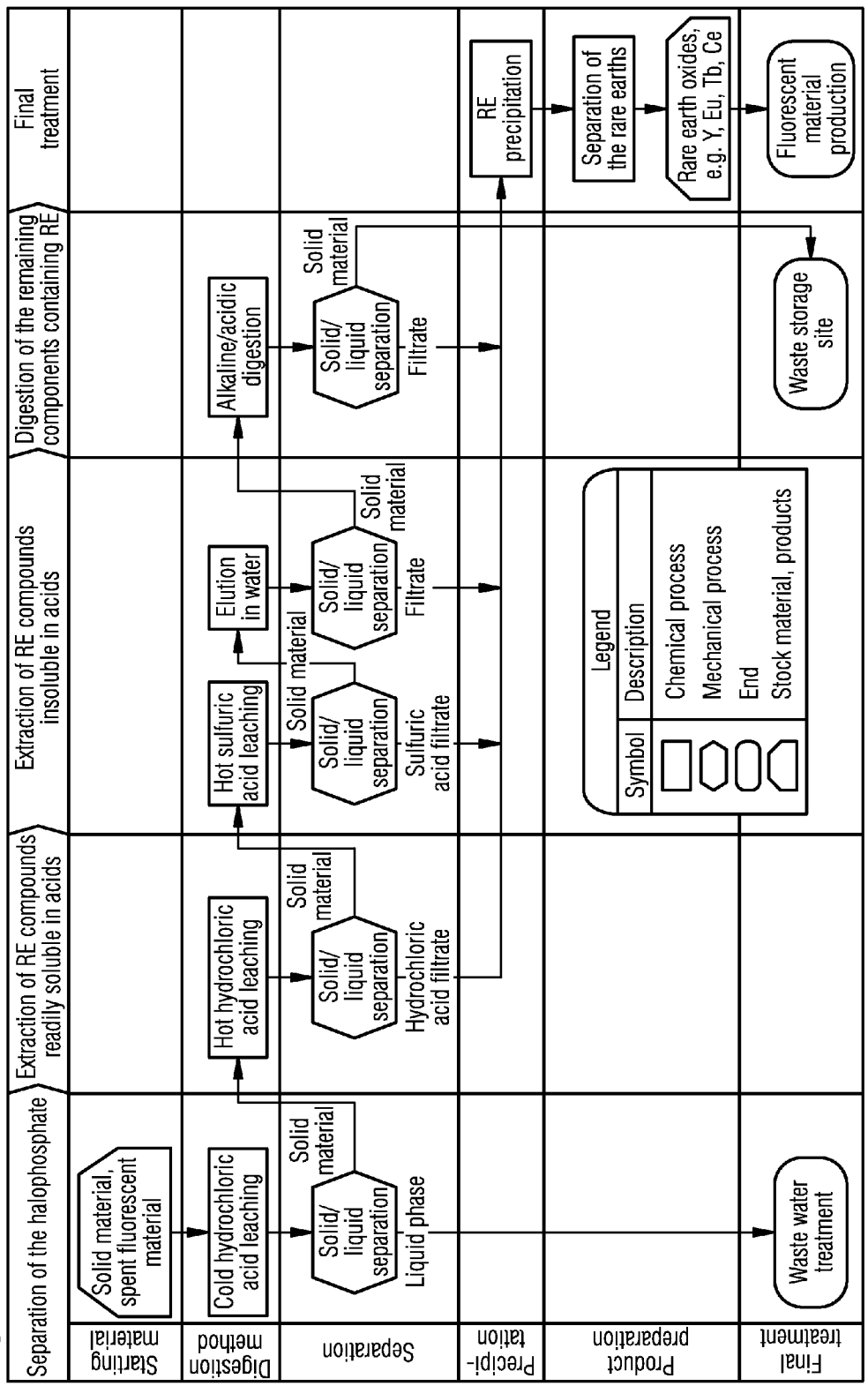
FIG. 1 shows a process scheme for fluorescent material recycling according to the invention.

FIG. 1 shows a scheme for the sequence of the recycling. Halophosphate is separated in a first step of the method by cold leaching. The extraction of the rare earths is carried out in three separate stages, depending on the solubility of the compounds encountered. The liquid phases are collected and reprocessed to form rare earths.

Figure 2:
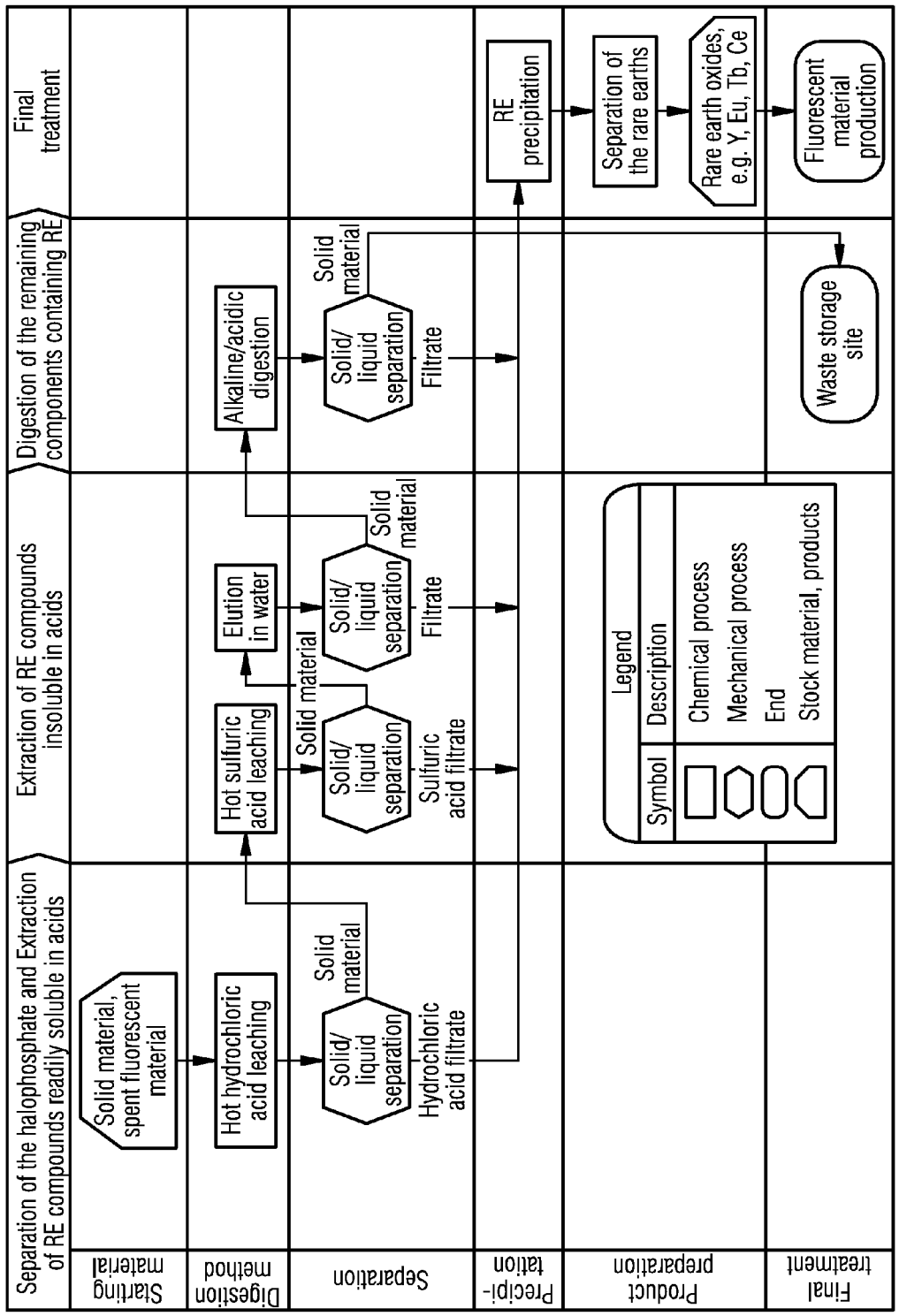
FIGS. 2 to 5 respectively show an alternative process scheme.

FIG. 2 shows another exemplary embodiment of the sequence of the recycling. Unlike in Scheme 1, halophosphate and readily soluble fluorescent materials containing rare earth are dissolved together. Digestion of the insoluble rare earth fluorescent materials is carried out in two stages.

Figure 3:
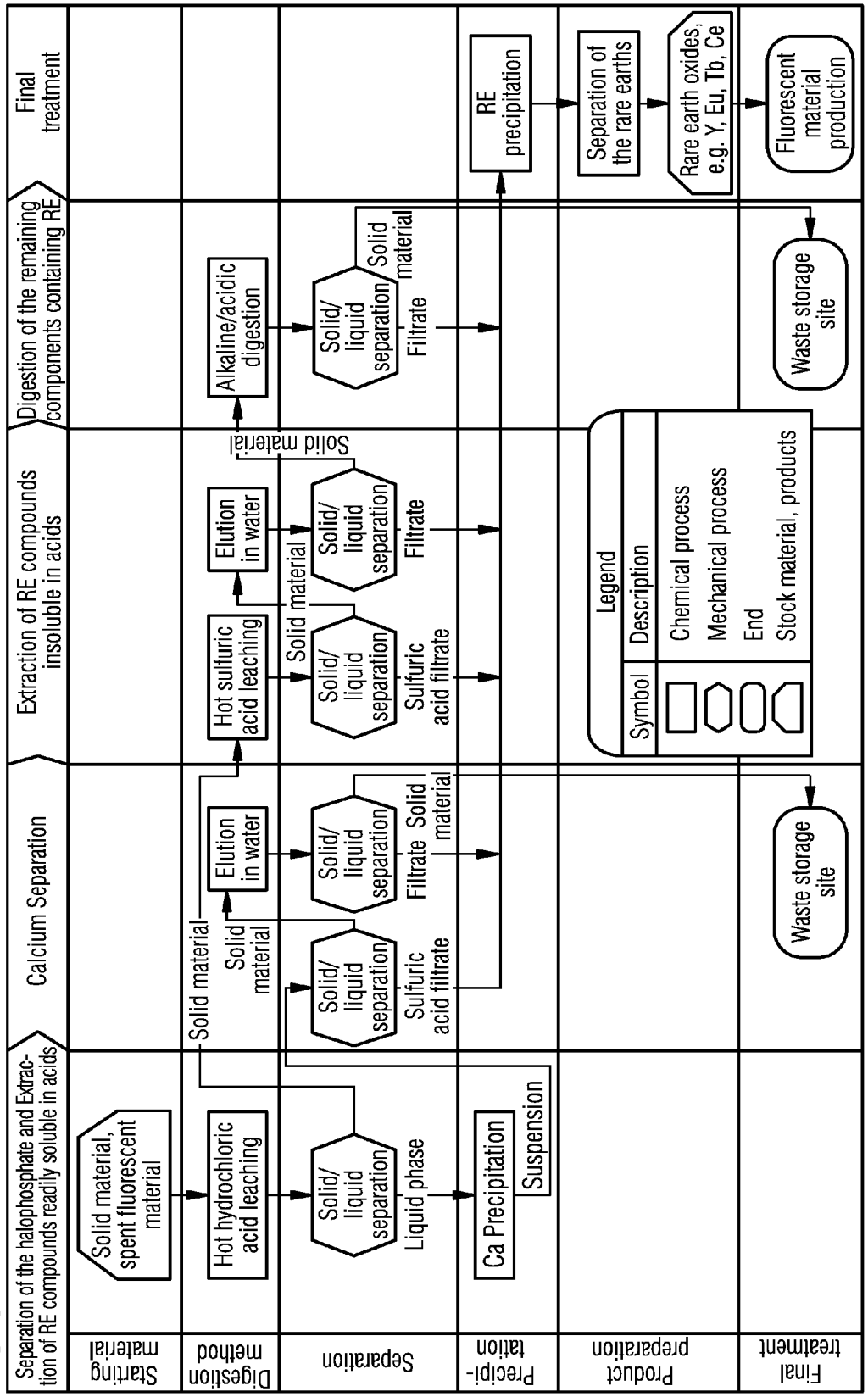

FIG. 3 shows a third exemplary embodiment of the sequence of the recycling. Unlike in Scheme 2, calcium ions are separated after dissolving halophosphate and readily soluble fluorescent materials containing rare earth.

Figure 4:
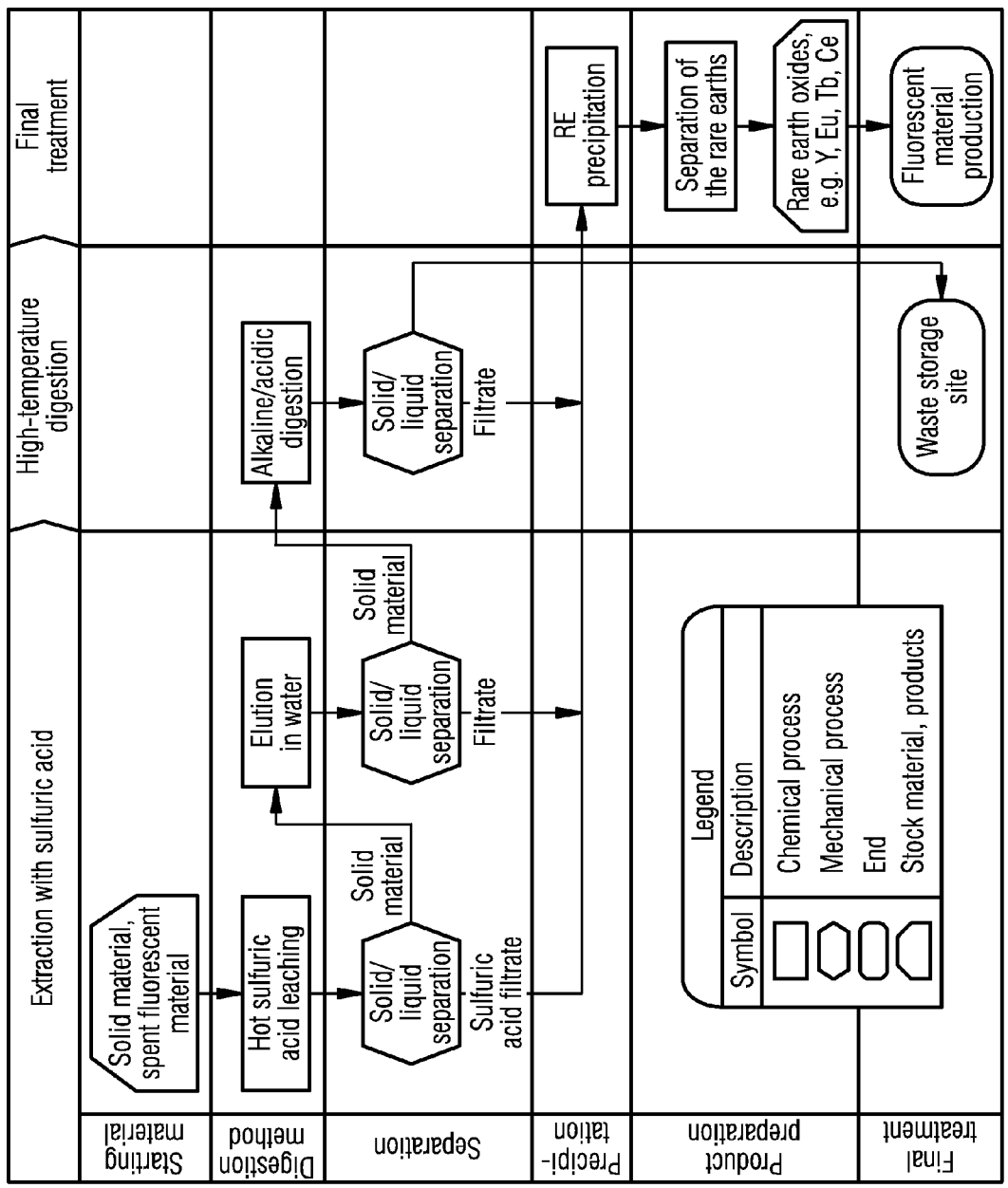

FIG. 4 shows a fourth embodiment of the sequence of the recycling. Unlike in Schemes 1-3, both compounds readily soluble and compounds insoluble in acid are digested in the first step and calcium ions are simultaneously separated.

Figure 5:
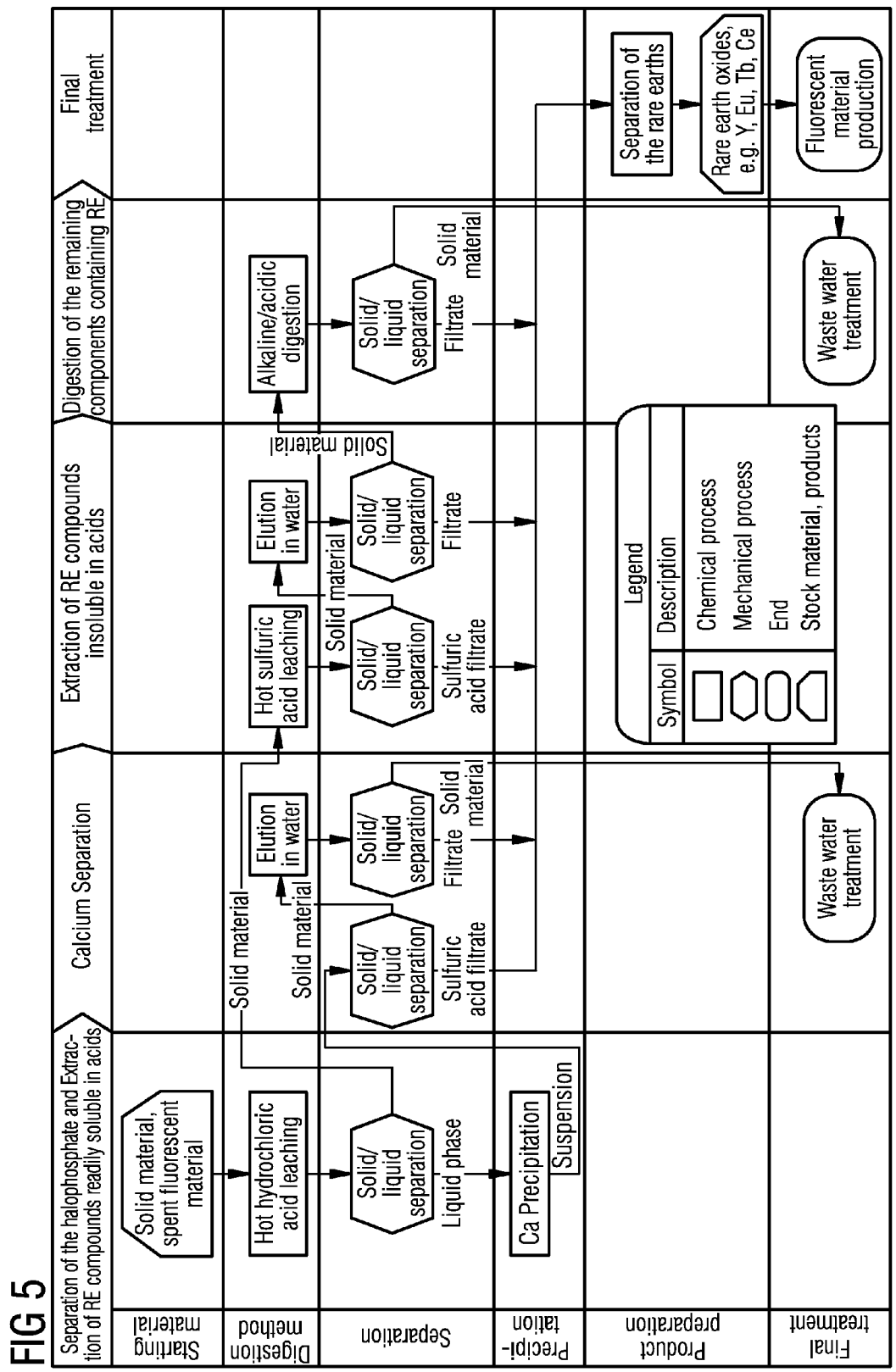

FIG. 5 shows another exemplary embodiment. In principle it is possible and also expedient for certain fluorescent materials in the recycling fluorescent material, for the liquid phase containing RE not to be mixed with other during extraction of the RE in a plurality of stages, but instead to be reprocessed separately.

With corresponding conditions (for example extraction of the RE from the recycling fluorescent material and RE separation path on the same site), direct separation without prior precipitation and heat treatment is to be preferred.

The invention claimed is:

1. A method for recovering rare earths from lamp waste A which contains a plurality of fluorescent materials which comprises halophosphates and rare earth fluorescent material, wherein the method comprises the following sequence of method steps:
   a) a mechanical treatment step, wherein the lamp waste A is treated to remove coarse constituents A' to leave a solid starting material A" which comprises rare earth containing fluorescent material;
   b) an extraction step to extract halophosphates, wherein the solid starting material A" undergoes a cold acid leaching to produce a liquid filtrate B' and a solid residue B", wherein B' contains waste material comprising halophosphates and B" comprises rare earth compounds;
   c) an extraction step to extract rare earth compounds, yet insoluble in step b), yet readily soluble in acids, wherein the residue B" undergoes a hot acid leaching to produce a liquid filtrate C' and a solid residue C", wherein C' contains rare earth compounds readily soluble in acids and solid residue C" contains as yet insoluble rare earth compounds;
   d) a digestion step by way of alkaline digestion to digest compounds containing rare earth material, yet insoluble in step c), wherein the solid residue C" is digested and extracted with hot water or acid to produce a liquid filtrate D' containing rare earth compounds and solid waste residue D";
   e) a final treatment step to precipitate rare earth material wherein the liquid filtrates C' and D' are each treated to recover the rare earths as precipitates.

2. The method for recovering rare earths from lamp waste as claimed in claim 1, wherein the alkaline digestion in step d) is carried out by digesting the solid residue C" using potassium or sodium hydroxide.

3. The method for recovering rare earths from lamp waste as claimed in claim 1, wherein the alkaline digestion step d) is carried out by digesting the solid residue C" by way of a soda/potash melt.

* * * * *